United States Patent
Park et al.

(10) Patent No.: US 7,289,710 B2
(45) Date of Patent: Oct. 30, 2007

(54) OPTICAL FIBER SUITABLE FOR HIGH-SPEED LARGE-SCALE WDM SYSTEM, OPTICAL TRANSMISSION LINE AND OPTICAL TRANSMISSION SYSTEM USING THE SAME

(75) Inventors: Hye-Young Park, Seoul (KR); Joon-Ho Moon, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 0 days.

(21) Appl. No.: 10/564,704

(22) PCT Filed: Sep. 30, 2003

(86) PCT No.: PCT/KR03/02006

§ 371 (c)(1),
(2), (4) Date: Jan. 13, 2006

(87) PCT Pub. No.: WO2005/008306

PCT Pub. Date: Jan. 27, 2005

(65) Prior Publication Data

US 2006/0222308 A1 Oct. 5, 2006

(30) Foreign Application Priority Data

Jul. 23, 2003 (KR) .................... 10-2003-0050740

(51) Int. Cl.
*G02B 6/36* (2006.01)
(52) U.S. Cl. ..................... 385/127; 385/123
(58) Field of Classification Search ......... 385/123–127
See application file for complete search history.

(56) References Cited

U.S. PATENT DOCUMENTS

| | | | |
|---|---|---|---|
| 6,819,847 B2* | 11/2004 | Matsuo et al. | 385/123 |
| 6,928,222 B2* | 8/2005 | Sillard et al. | 385/127 |
| 2001/0022883 A1* | 9/2001 | Montmorillon et al. | 385/123 |
| 2003/0077057 A1* | 4/2003 | Kato et al. | 385/123 |
| 2003/0152347 A1* | 8/2003 | Matsuo et al. | 385/123 |

* cited by examiner

*Primary Examiner*—Sarah Song
(74) *Attorney, Agent, or Firm*—Jones Day (57) ABSTRACT

Disclosed is a single-mode optical fiber suitable for and optical transmission line used in WDM (Wavelength Division Multiplexing) system, which has low dispersion slope, sufficient dispersion value and large effective section area over S-, C- and L-band (1460~1625 nm) to enable high-speed, large-capacity signal transmission. The optical fiber uses the wavelength region from 1460 to 1625 nm, and the optical fiber also has a dispersion value of 0.1~3.0 ps/nm-km, more preferably 0.3~2.4 ps/nm-km, at 1460 nm, a dispersion value of 3.0~5.5 ps/nm-km, more preferably 3.2~5.2 ps/nm-km, at 1550 nm, and a dispersion value of 4.5~8.0 ps/nm-km, more preferably 4.8~7.7 ps/nm-km, at 1625 nm. In addition, the optical fiber has a dispersion slope of 0.023~0.05 ps/nm-km$^2$ at 1550 nm, an effective sectional area of 35~50 μm$^2$ at 1550 nm, an effective section area of 35~50 μm$^2$ at 1460 nm. Thus, though the signal is transmitted through S-, C- and L-band, this optical fiber may suppress nonlinear phenomenon and signal distortion to the minimum.

30 Claims, 5 Drawing Sheets

OPTICAL FIBER SUITABLE FOR HIGH-SPEED LARGE-SCALE WDM SYSTEM, OPTICAL TRANSMISSION LINE AND OPTICAL TRANSMISSION SYSTEM USING THE SAME

TECHNICAL FIELD

The present invention relates to an optical fiber suitable for an optical transmission line used in a WDM (Wavelength Division Multiplexing) system, and more particularly to a single-mode optical fiber with low dispersion slope, sufficient dispersion value and large effective section area for enabling high-speed large-capacity signal transmission over S-, C- and L-band (1460 to 1625 nm).

BACKGROUND ART

A WDM system may effectively increase transmission capacity by higher transmission speed, narrower channel spacing, or wider transmission wavelength band.

The transmission speed of the system is recently increased from 2.5 Gb/s to 10 Gb/s, and it is estimated that 40 Gb/s transmission system will emerge in the market in a few years. In order to increase transmission speed, higher optical power per each channel should be provided, and due to higher optical power, non-linearity in an optical fiber is increased to deteriorate transmission characteristics.

In a system for long-distance transmission at a transmission speed of 40 Gb/s, a Raman amplifier may be used instead of existing EDFA (Erbium Doped Fiber Amplifier) to reduce non-linearity in the optical fiber. In addition, since the limit on the signal distortion by dispersion is in the inverse relation to the square of transmission speed, if the speed is increased four times, that limit is decreased to one sixteenth. Thus, the system with a transmission speed of 40 Gb/s requires accurate dispersion compensation so that accumulated dispersion of a transmission channel does not exceed the limit. For this purpose, RDS (Relative Dispersion Slope) of a dispersion compensating fiber should be similar to RDS of an optical fiber used as a transmission line. Here, RDS is defined as dispersion slope divided by dispersion, and each characteristic is described at the same wavelength.

In order to increase transmission capacity, channel spacing of the system is narrowed from 200 GHz (1.6 nm) to 100 GHz (0.8 nm) and even to less than 50 GHz (0.4 nm). However, if the channel spacing is narrowed, signal distortion is caused due to non-linear phenomenon such as four-wave mixing or cross phase modulation. In particular, in case that dispersion is not provided sufficient to prevent a phase matching condition, crosstalk power is generated by four wave mixing, thereby distorting signals.

Crosstalk power is related to channel power and channel spacing of the system, and dispersion and effective section area of the optical fiber. If the channel power is lowered to suppress non-linearity, OSNR (Optical Signal Noise Ratio) is deteriorated to make a transmission distance shorter, thereby increasing cost of the system required for longer distance transmission.

In addition, the larger dispersion of the optical fiber lowers the crosstalk power, but the length of the dispersion compensating fiber is extended in proportion to the dispersion of the optical fiber, and the loss in the part of dispersion compensation is increased. Thus, it is needed to optimize dispersion of an optical fiber according to features of a system.

Effective section area of an optical fiber shows optical intensity per unit area. As the effective section area is larger, non-linear phenomenon is more easily suppressed.

In case of increasing transmission capacity by using additional wavelength band other than C-band (1530 to 1565 nm) and L-band (1565 to 1625 nm), using a longer wavelength than L-band is not preferred because of increase in a bending loss of an optical fiber. Thus, S-band (1460 to 1530 nm) belonging to shorter wavelength bands than C-band is preferably used. However, in this case, sufficient dispersion value is required at or near 1460 nm in order to suppress four-wave mixing in the transmission wavelength band.

In addition, if dispersion slope of an optical fiber is low, dispersion in the longer wavelength region may be decreased, thereby making it possible to extend a transmittable distance without dispersion compensation over a wide wavelength band.

Along with the changes of circumstances around WDM system, various optical fibers suitable for the changes have been proposed.

U.S. Pat. No. 5,327,516 discloses an optical fiber with the dispersion in range of 1.5 to 4 ps/nm-km at 1550 nm in order to, solve the problem that a conventional dispersion shifted fiber having dispersion approximate to zero at 1550 nm causes a large amount of four-wave mixing to deteriorate transmission characteristics. However, the optical fiber proposed in U.S. Pat. No. 5,327,516 is directed to use in a system for 360 km repeater-less transmission with transmission speed of 5 Gb/s or more, channel spacing of 1.0 to 2.0 nm and four or more channels. Thus, when the optical fiber is used in a system with channel spacing of 1.0 nm or less, non-linearity is increased, which might deteriorate transmission characteristics due to signal distortion caused by four-wave mixing or cross phase modulation.

In addition, U.S. Pat. No. 5,835,655 discloses an optical fiber with an increased effective section area more than 70 $\mu m^2$ and the zero dispersion wavelength is shifted out of the transmission wavelength band to suppress four-wave mixing. The optical fiber proposed in U.S. Pat. No. 5,835,655 is more effective in restraining signal distortion caused by non-linearity due to larger effective section area. In addition, since the zero-dispersion wavelength is located in 1500 to 1540 nm or 1560 to 1600 nm wavelength region, it is possible to restrain signal distortion in C-band that is caused by four-wave mixing. However, the larger effective section area makes dispersion slope higher, and that makes a dispersion value in a long wavelength band increased. As a consequence of larger effective section area and higher dispersion slope, the transmission wavelength region without dispersion compensation is narrowed.

U.S. Pat. No. 6,396,987 discloses an optical fiber capable of decreasing dispersion compensation costs rather than a general single-mode optical fiber in a system with transmission speed of 40 Gb/s. That is to say, the optical fiber of U.S. Pat. No. 6,396,987 has dispersion of 6 to 10 ps/nm-km at 1550 nm, dispersion slope of 0.07 ps/nm²-km or less, and effective section area of 60 $\mu m^2$ or more. In this case, since zero-dispersion wavelength is located near 1460 nm, i.e. Raman amplification pump wavelength, signal distortion may be caused by four-wave mixing at the pump wavelength band.

DISCLOSURE OF INVENTION

The present invention is directed to providing an optical fiber suitable as an optical transmission line adopted in a WDM system.
}

In addition, the present invention is directed to providing an optical fiber with optimized dispersion, dispersion slope, and effective section area in order to enable long-distance transmission with low loss without signal distortion in a high-speed (40 Gb/s or higher) large-capacity (with narrow channel spacing of 50 GHz or less) system.

Moreover, the present invention is directed to providing an optical fiber capable of long-distance transmission without dispersion compensation in wide wavelength bands S-, C- and L-band.

Furthermore, the present invention is directed to providing an optical transmission line using the aforementioned optical fiber, and an optical communication system employing the optical transmission line.

In one aspect of the present invention, the optical fiber includes a core region positioned in the center of cross section and having a relatively high refractive index, and a clad region surrounding the core region and having a relatively low refractive index.

The core region includes (a) a first core region positioned in the center of cross section and having a radius $r_1$ from the center and a relative refractive index difference $\Delta_1$; (b) a second core region surrounding the first core region and having a radius $r_2$ from the center and a relative refractive index difference $\Delta_2$; and (c) a third core region surrounding the second core region and having a radius $r_3$ from the center and a relative refractive index difference $\Delta_3$, and the clad region surrounding the third core region and having a radius $r_4$ from the center and a relative refractive index difference $\Delta_4$.

Preferably, the radii of the regions have a relation of $r_1 < r_2 < r_3 < r_4$, and the relative refractive index differences of the regions have relations of $\Delta_1 > \Delta_2$, and $\Delta_2 < \Delta_3$ (here, $\Delta_1(\%) = [(n_1 - n_c)/n_c] \times 100$, $\Delta_2(\%) = [(n_2 - n_c)/n_c] \times 100$, $\Delta_3(\%) = [(n_3 - n_c)/n_c] \times 100$, $n_1$: a refractive index of the first core region, $n_2$: a refractive index of the second core region, $n_3$: a refractive index of the third core region, $n_c$: a refractive index of the clad region).

In addition, the optical fiber preferably uses wavelength region from 1460 to 1625 nm, and also preferably has a dispersion value of 0.1 to 3.0 ps/nm-km (more preferably 0.3 to 2.4 ps/nm-km) at 1460 nm, 3.0 to 5.5 ps/nm-km (more preferably 3.2 to 5.2 ps/nm-km) at 1550 nm, and 4.5 to 8.0 ps/nm-km (more preferably 4.8 to 7.7 ps/nm-km) at 1625 nm.

Preferably, the optical fiber has a dispersion slope of 0.023 to 0.05 ps/nm²-km at 1550 nm, an effective section area of 35 to 50 µm² at 1550 nm, and an effective section area of 35 to 50 µm² at 1460 nm.

Thus, the optical fiber of the present invention makes it possible to suppress non-linearity and signal distortion to the minimum when a signal is transmitted in S-, C- and L-band.

In addition, it is preferred that the optical fiber has a cutoff wavelength of 1450 nm or below, a zero-dispersion wavelength is located at 1460 nm or below, and a bending loss is 0.5 dB or less at 1625 nm under the condition of a bending radius of 30 mm, 100 turns.

In another aspect of the invention, there is provided an optical transmission line using the aforementioned optical fiber, and there is also provided an optical communication system adopting the optical transmission line at least in a part of an optical transmission path.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, preferred embodiments of the present invention will be described in detail with reference to the accompanying drawings.

Figure 1:
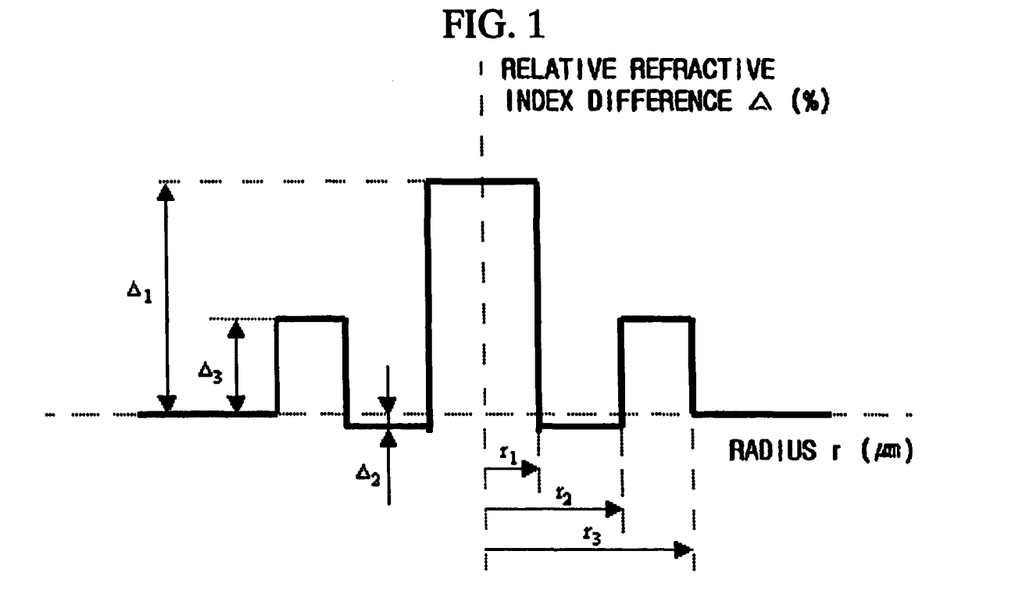
FIG. 1 is a graph showing a refractive index profile of an optical fiber according to a preferred embodiment of the present invention.
Figure 2:
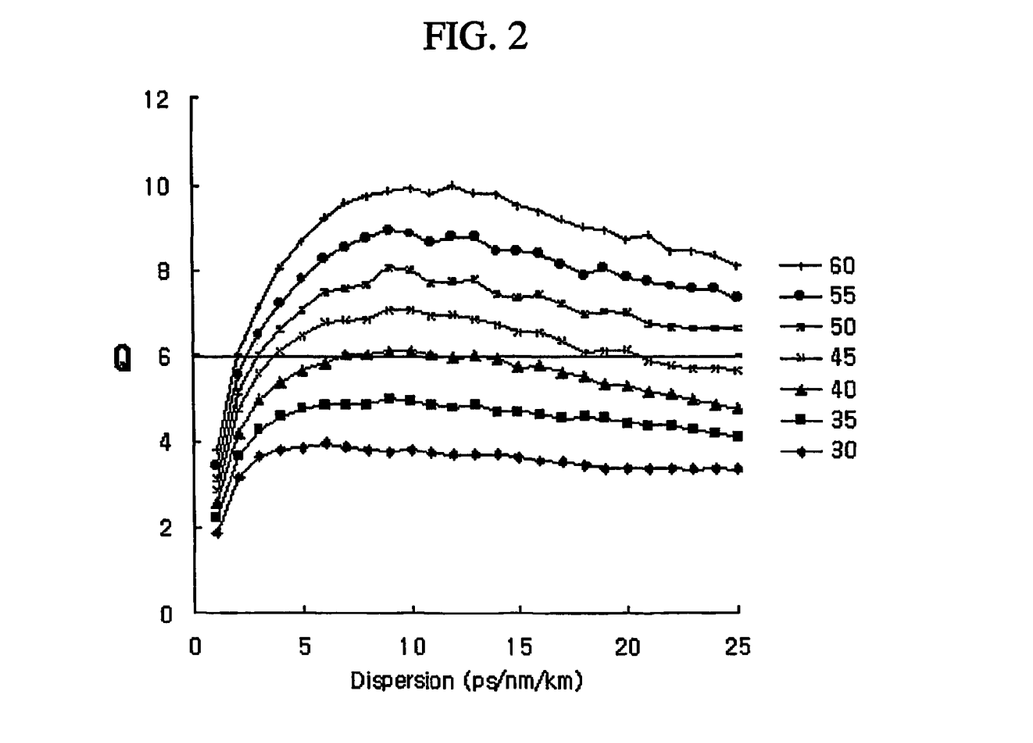
FIGS. 2 to 4 are graphs showing the change of transmission characteristic (Q) of the transmission system according to dispersion and effective section area of the optical fiber.

In order to examine changes of transmission characteristic Q due to dispersion and effective section area of an optical fiber in a system having transmission speed of 40 Gb/s, channel spacing of 100 GHz, channel number of 16, transmission distance of 240 km, and optical power per each channel of 5 dBm, transmission simulation was conducted and its result is shown in FIG. 2.

In the optical fiber, dispersion is in the range of 1 to 15 ps/nm-km and an effective section area is in the range of 30 to 60 µm². In FIG. 2, it may be understood that the transmission characteristic Q is 6 or above in case the optical fiber has an effective section area of 45 µm² or above and dispersion of 4 to 17 ps/nm-km.

Figure 3:
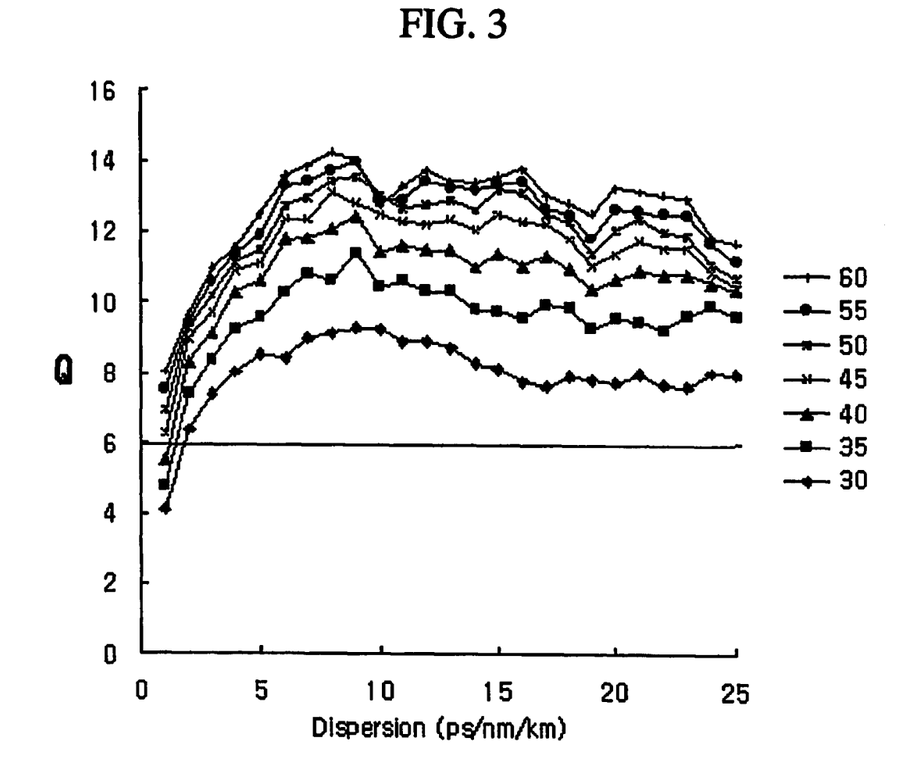

Raman amplification may lower the optical power per each channel without deteriorating the transmission characteristic, and if the power per each channel is low, it is possible to restrain non-linearity even though the dispersion and the effective section area are small. In order to examine the change of transmission characteristic due to dispersion and effective section area of an optical fiber in 40 Gb/s transmission system with low channel capacity, transmission simulation was conducted with channel spacing of 100 GHz, channel number of 16, transmission distance of 240 km and power for each channel of 2 dBm, and its result is shown in FIG. 3.

The optical fiber has dispersion in the range of 1 to 15 ps/nm-km and an effective section area in the range of 30 to 60 µm². In FIG. 3, it may be understood that the transmission characteristic Q has a value of 6 or above if the optical fiber has dispersion of 2 ps/nm-km or above and an effective section area of 30 µm² or above. Thus, in case the channel power is lowered through optimization, the same transmission characteristic may be ensured though the dispersion and the effective section area of the optical fiber become small.

Figure 4:
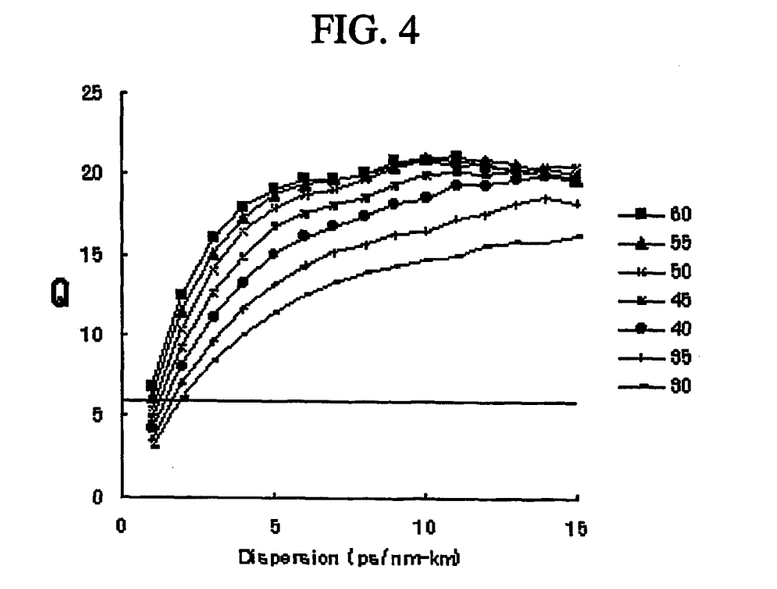

In order to examine changes of transmission characteristic Q due to dispersion and effective section area of an optical fiber in case channel spacing is narrow, transmission simulation was conducted in a system having transmission speed of 10 Gb/s, channel spacing of 50 GHz, channel number of 32, transmission distance of 240 km, and power for each channel of 0 dBm, and its result is shown in FIG. 4. In the optical fiber, dispersion is in the range of 1 to 15 ps/nm-km and an effective section area is in the range of 30 to 60 µm².

In FIG. 4, it may be understood that the transmission characteristic Q has a value of 6 or above in case the optical fiber has dispersion of 2 ps/nm-km or above and an effective section area of 35 μm² or above.

Putting the above results together, an optical fiber should have an effective section area of 35 μm² or above and dispersion of 2 ps/nm-km or above at a wavelength in use so as to be suitable for a system having a transmission speed of 10 Gb/s and channel spacing of 50 GHz or a system having a transmission speed of 40 Gb/s with low power for each channel.

EMBODIMENT 1

(1) radius: $r_1$=3.05 μm, $r_2$=5.38 μm, $r_3$=9.96 μm
(2) relative refractive index difference: $\Delta_1$(%)=0.54%, $\Delta_2$=−0.20%, $\Delta_3$=0.07%
(3) dispersion
1460 nm: 0.3 ps/nm-km, 1530 nm: 2.6 ps/nm-km, 1550 nm: 3.2 ps/nm-km,
1625 nm: 5.3 ps/nm-km
(4) dispersion slope
1550 nm: 0.028 ps/nm²-km
(5) mode field diameter (MFD)
1460 nm: 7.1 μm, 1530 nm: 7.5 μm, 1550 nm: 7.6 μm, 1625 nm: 8.1 μm
(6) effective section area
1460 nm: 40 μm², 1530 nm: 44 μm², 1550 nm: 45 μm², 1625 nm: 50 μm²

EMBODIMENT 2

(1) radius: $r_1$=3.05 μm, $r_2$=5.75 μm, $r_3$=10.79 μm
(2) relative refractive index difference: $\Delta_1$(%)=0.55%, $\Delta_2$=−0.18%, $\Delta_3$=0.09%
(3) dispersion
1460 nm: 0.7 ps/nm-km, 1530 nm: 2.7 ps/nm-km, 1550 nm: 3.2 ps/nm-km,
1625 nm: 4.9 ps/nm-km
(4) dispersion slope
1550 nm: 0.023 ps/nm²-km
(5) mode field diameter (MFD)
1460 nm: 7.1 μm, 1530 nm: 7.5 μm, 1550 nm: 7.6 μm, 1625 nm: 8.1 μm
(6) effective section area
1460 nm: 39 μm², 1530 nm: 43 μm², 1550 nm: 44 μm², 1625 nm: 50 μm²

EMBODIMENT 3

(1) radius: $r_1$=3.12 μm, $r_2$=5.56 μm, $r_3$=9.92 μm
(2) relative refractive index difference: $\Delta_1$(%)=0.53%, $\Delta_2$=−0.23%, $\Delta_3$=0.10%
(3) dispersion
1460 nm: 0.7 ps/nm-km, 1530 nm: 2.7 ps/nm-km, 1550 nm: 3.2 ps/nm-km,
1625 nm: 4.8 ps/nm-km
(4) dispersion slope
1550 nm: 0.024 ps/nm²-km
(5) mode field diameter (MFD)
1460 nm: 7.1 μm, 1530 nm: 7.5 μm, 1550 nm: 7.6 μm, 1625 nm: 8.1 μm
(6) effective section area
1460 nm: 40 μm², 1530 nm: 44 μm², 1550 nm: 45 μm², 1625 nm: 51 μm²

EMBODIMENT 4

(1) radius: $r_1$=3.24 μm, $r_2$=5.72 μm, $r_3$=8.54 μm
(2) relative refractive index difference: $\Delta_1$(%)=0.48%, $\Delta_2$=−0.17%, $\Delta_3$=0.15%
(3) dispersion
1460 nm: 0.5 ps/nm-km, 1530 nm: 3.5 ps/nm-km, 1550 nm: 4.4 ps/nm-km,
1625 nm: 7.7 ps/nm-km
(4) dispersion slope
1550 nm: 0.043 ps/nm²-km
(5) mode field diameter (MFD)
1460 nm: 7.8 μm, 1530 nm: 8.3 μm, 1550 nm: 8.4 μm, 1625 nm: 9.0 μm
(6) effective section area
1460 nm: 47 μm², 1530 nm: 53 μm², 1550 nm: 55 μm², 1625 nm: 62 μm²

EMBODIMENT 5

(1) radius: $r_1$=3.37 μm, $r_2$=5.77 μm, $r_3$=9.35 μm
(2) relative refractive index difference: $\Delta_1$(%)=0.50%, $\Delta_2$=−0.25%, $\Delta_3$=0.14%
(3) dispersion
1460 nm: 2.4 ps/nm-km, 1550 nm: 5.2 ps/nm-km, 1625 nm: 7.2 ps/nm-km
(4) dispersion slope
1550 nm: 0.026 ps/nm²-km
(5) mode field diameter (MFD)
1460 nm: 7.4 μm, 1550 nm: 7.9 μm, 1625 nm: 8.4 μm
(6) effective section area
1460 nm: 43 μm², 1550 nm: 49 μm², 1625 nm: 55 μm²

EMBODIMENT 6

(1) radius: $r_1$=3.18 μm, $r_2$=6.18 μm, $r_3$=8.65 μm
(2) relative refractive index difference: $\Delta_1$(%)=0.51%, $\Delta_2$=−0.19%, $\Delta_3$=0.14%
(3) dispersion
1460 nm: 2.4 ps/nm-km, 1550 nm: 5.2 ps/nm-km, 1625 nm: 7.3 ps/nm-km
(4) dispersion slope
1550 nm: 0.029 ps/nm²-km
(5) mode field diameter (MFD)
1460 nm: 7.3 μm, 1550 nm: 7.8 μm, 1625 nm: 8.2 μm
(6) effective section area
1460 nm: 41 μm², 1550 nm: 47 μm², 1625 nm: 52 μm²

In the embodiments 1 to 6, the radius and the relative refractive index difference may have a manufacturing tolerance (for example, ±0.6 μm in case of radius, ±0.03% in case of relative refractive index difference).

Figure 5A:
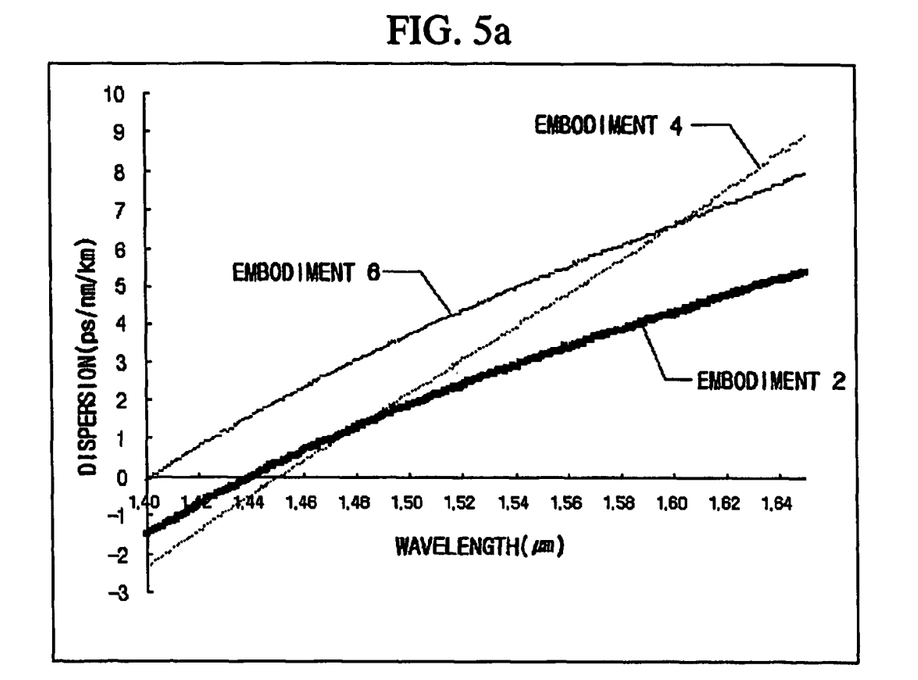
FIGS. 5a and 5b are graphs showing a dispersion characteristic at each wavelength of the optical fiber according to the embodiment of the present invention.
Figure 5B:
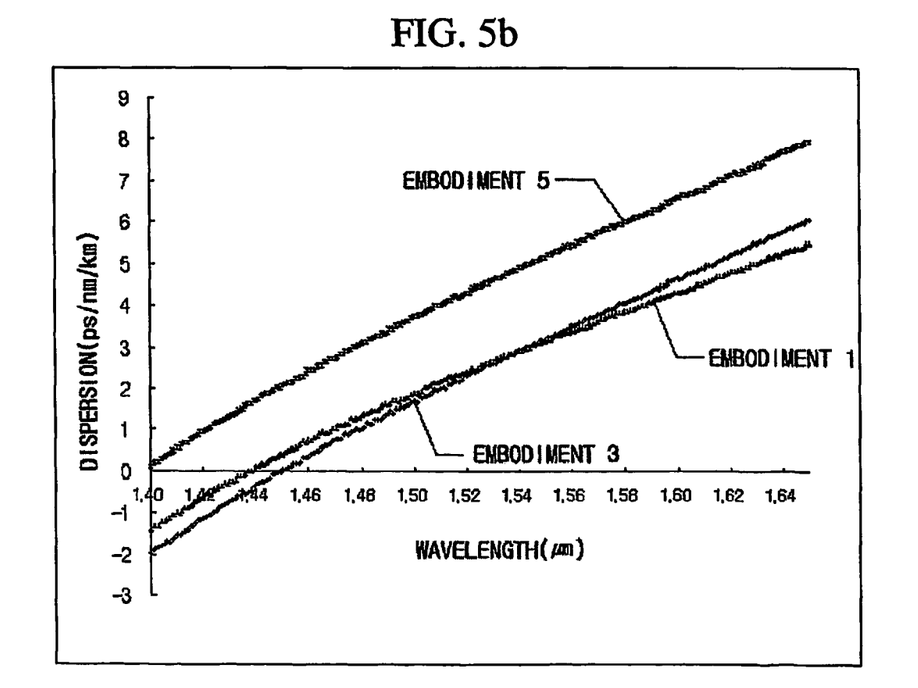

Dispersion characteristics for each wavelength of the optical fiber corresponding to the embodiments 1 to 6 are shown in FIGS. 5a and 5b. The optical fiber corresponding to the embodiments 1 to 4 has dispersion of 2.0 ps/nm-km or above at 1530 nm with positive dispersion slope. The optical fiber corresponding to the embodiments 5 and 6 has dispersion of 2.0 ps/nm-km or above at 1460 nm with positive dispersion slope.

Figure 6A:
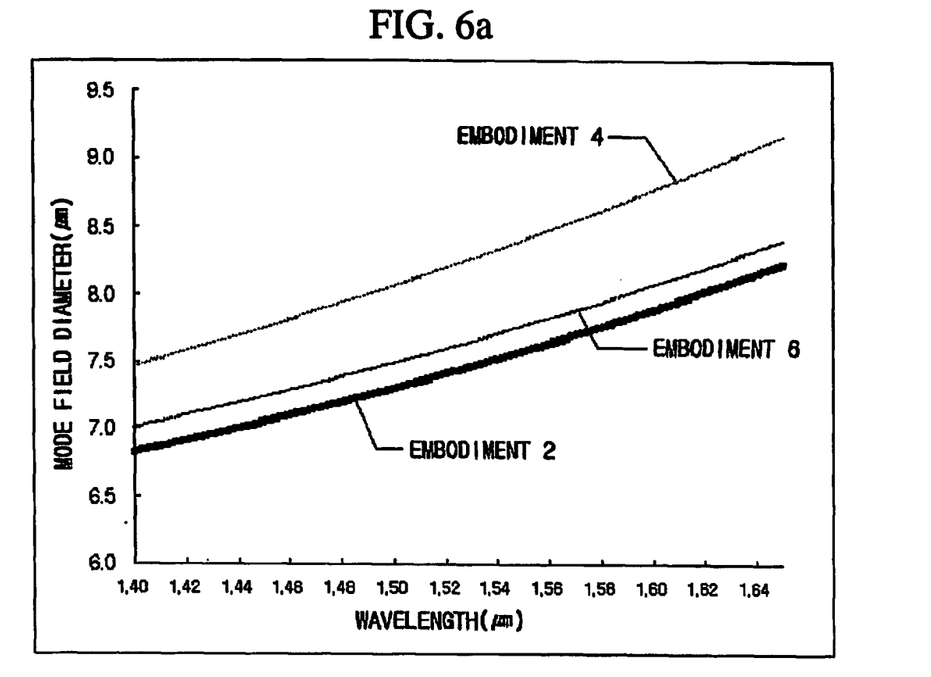
FIGS. 6a and 6b are graphs showing a mode field diameter (MFD) at each wavelength of the optical fiber according to the embodiment of the present invention.
Figure 6B:
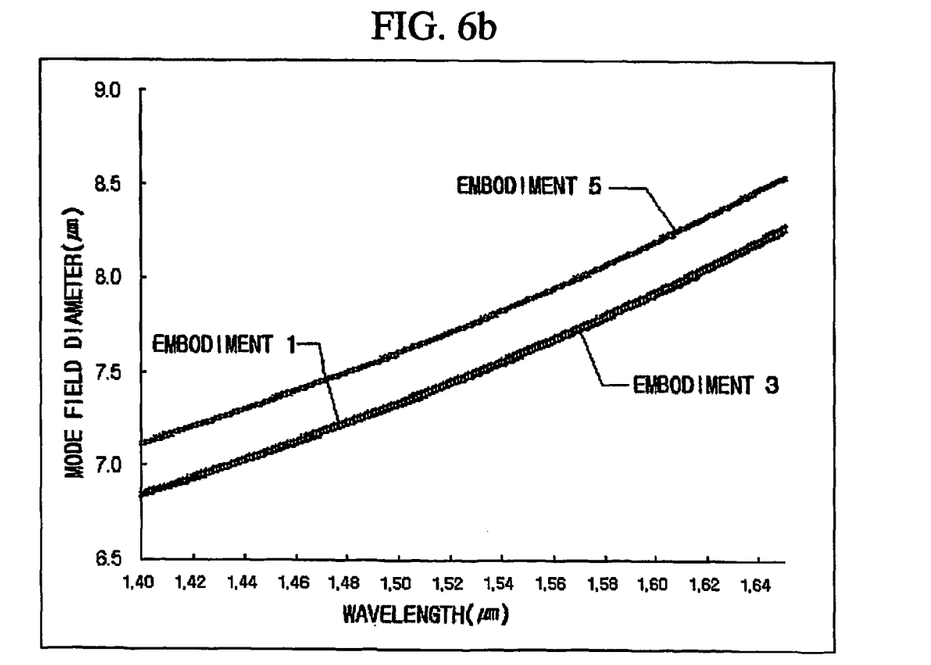

MFD characteristics for each wavelength of the optical fiber corresponding to the embodiments 1 to 6 are shown in FIGS. 6a and 6b. The optical fiber corresponding to the embodiments 1 to 6 has MFD of 7.0 μm or above at 1550 nm.

Figure 7A:
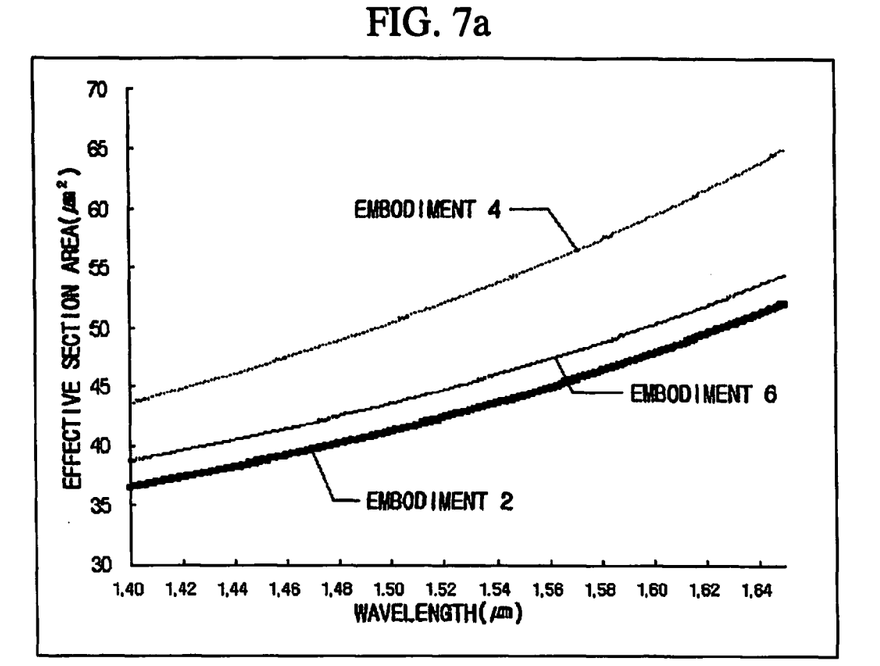
FIGS. 7a and 7b are graphs showing an effective section area at each wavelength of the optical fiber according to the embodiment of the present invention.
Figure 7B:
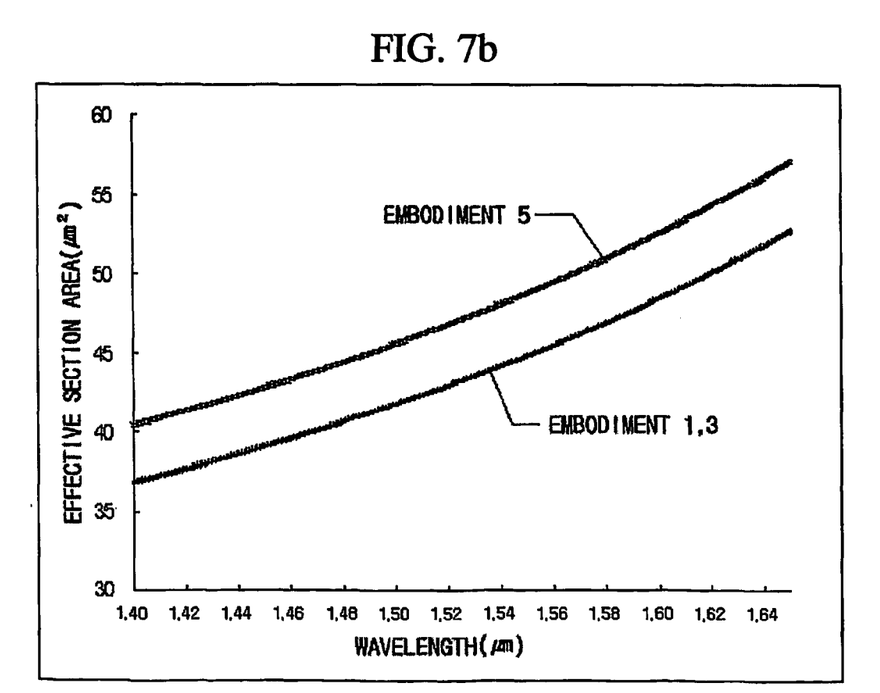

Effective section characteristics of the optical fiber corresponding to the embodiments 1 to 6 are shown in FIGS. 7a and 7b. The optical fiber corresponding to the embodiments 1 to 4 has an effective section area of 40 μm² or above at 1530 nm, and also 40 μm² or above even in C- and L-band. In addition, the optical fiber corresponding to the embodiments 5 and 6 has an effective section area of 40 μm² or above at 1460 nm, and also 40 μm²or above even in S-, C- and L-band.

Since the optical fiber corresponding to the embodiments 1 to 4 has dispersion of 2.0 ps/nm-km or above and an effective section area of 35 μm² or above at a wavelength band longer than 1530 nm as mentioned above, the transmission characteristic Q is 6 or higher and excellent transmission characteristic is given for C- and L-band transmission in a system having a transmission speed of 10 Gb/s and channel spacing of 50 GHz or a system having a transmission speed of 40 Gb/s with low channel capacity. In addition, the optical fiber corresponding to the embodiments 1 to 3 may be transmitted as much as 170 km without dispersion compensation in 10 Gb/s transmission system since dispersion at 1625 nm is 6.0 ps/nm-km or below.

The optical fiber corresponding to the embodiments 5 and 6 has dispersion of 2.0 ps/nm-km or above and an effective section area of 35 μm² or above at a wavelength band longer than 1460 nm, so the transmission characteristic Q is 6 or higher and excellent transmission characteristic is given for C- and L-band transmission in a system having a transmission speed of 10 Gb/s and channel spacing of 50 GHz or a system having a transmission speed of 40 Gb/s with low power for each channel. In addition, the optical fiber corresponding to the embodiments 5 and 6 may be transmitted as much as 130 km without dispersion compensation in 10 Gb/s transmission system since dispersion at 1625 nm is 8.0 ps/nm-km or below.

As described above, the optical fiber according to the present invention has a loss lower than 0.25 dB at 1550 nm and 1625 nm. The cable cutoff wavelength is 1450 nm or below, and a bending loss at 1625 nm is 0.5 dB or below under the condition of a bending radius of 30 mm, 100 turns. In addition, PMD (Polarization Mode Dispersion) of the optical fiber is 0.2 ps/or below, and transmission is possible as long as about 4000 km in 10 Gb/s transmission system and about 80 km in 40 Gb/s transmission system.

It should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

INDUSTRIAL APPLICABILITY

The present invention provides an optical fiber of which dispersion, dispersion slope and effective section area are optimized suitable for a high-speed large-capacity optical communication system such as a WDM (Wavelength Division Multiplexing) system having a transmission speed equal to or greater than 10 Gb/s, channel spacing of 50 GHz or less, and an optical band width over transmission wavelength region in S-, C- and L-band.

What is claimed is:

1. A single-mode optical fiber suitable for a WDM (Wavelength Division Multiplexing) system, comprising:
    (a) a first core region positioned in the center of cross section and having a radius $r_1$ from the center and a relative refractive index difference $\Delta_1$;
    (b) a second core region surrounding the first core region and having a radius $r_2$ from the center and a relative refractive index difference $\Delta_2$;
    (c) a third core region surrounding the second core region and having a radius $r_3$ from the center and a relative refractive index difference $\Delta_3$; and
    (d) a clad region surrounding the third core region and having a radius $r_4$ from the center and a relative refractive index difference $\Delta_4$,
    (e) wherein the radii of the regions have a relation of $r_1<r_2<r_3<r_4$, and the relative refractive index difference of the regions have relations of $\Delta_1>\Delta_2$, and $\Delta_2<\Delta_3$;
    (here, $\Delta_1(\%)=[(n_1-n_c)/n_c]\times 100$, $\Delta_2(\%)=[(n_2-n_c)/n_c]\times 100$, $\Delta_3(\%)=[(n_3-n_c)/n_c]\times 100$, $n_1$: a refractive index of the first core region, $n_2$: a refractive index of the second core region, $n_3$: a refractive index of the third core region, $n_c$: a refractive index of the clad region)
    (f) wherein the optical fiber uses a wavelength region from 1460 to 1625 nm, and has a dispersion value of 0.1 to 3.0 ps/nm-km at 1460 nm, 3.0 to 5.5 ps/nm-km at 1550 nm, and 4.5 to 8.0 ps/nm-km at 1625 nm, and
    (g) wherein a bending loss is 0.5 dB or less at 1625 nm under the condition of a bending radius of 30 mm, 100 turns.

2. The single-mode optical fiber according to claim 1, wherein the optical fiber has a positive dispersion slope in the wavelength band for use.

3. The single-mode optical fiber according to claim 2, wherein the optical fiber has a dispersion slope of 0.023 to 0.05 ps/nm²-km at 1550 nm.

4. The single-mode optical fiber according to claim 3, wherein the optical fiber has an effective section area of 35 to 50 μm² at 1550 nm.

5. The single-mode optical fiber according to claim 4, wherein the optical fiber has a cutoff wavelength of 1450 nm or below.

6. The single-mode optical fiber according to claim 4, wherein a zero-dispersion wavelength is located at 1460 nm or below.

7. The single-mode optical fiber according to claim 4, wherein the optical fiber has a dispersion value of 0.3 to 2.4 ps/nm-km at 1460 nm.

8. The single-mode optical fiber according to claim 4, wherein the optical fiber has a dispersion value of 3.2 to 5.2 ps/nm-km at 1550 nm.

9. The single-mode optical fiber according to claim 4, wherein the optical fiber has a dispersion value of 4.8 to 7.7 ps/nm-km at 1625 nm.

10. The single-mode optical fiber according to claim 3, wherein the optical fiber has an effective section area of 35 to 50 μm² at 1460 nm.

11. The single-mode optical fiber according to claim 10, wherein the optical fiber has a cutoff wavelength of 1450 nm or below.

12. The single-mode optical fiber according to claim 10, wherein a zero-dispersion wavelength is located at 1460 nm or below.

13. The single-mode optical fiber according to claim 10, wherein the optical fiber has a dispersion value of 0.3 to 2.4 ps/nm-km at 1460 nm.

14. The single-mode optical fiber according to claim 10, wherein the optical fiber has a dispersion value of 3.2 to 5.2 ps/nm-km at 1550 nm.

15. The single-mode optical fiber according to claim 10, wherein the optical fiber has a dispersion value of 4.8 to 7.7 ps/nm-km at 1625 nm.

16. The single-mode optical fiber according to claim 1,
i) wherein the first core region has a radius $r_1=3.05\pm0.6$ μm and a relative refractive index difference $\Delta_1(\%)=0.54\pm0.03\%$;
ii) wherein the second core region has a radius $r_2=5.38\pm0.6$ μm and a refractive index difference $\Delta_2=-0.20\pm0.03\%$; and
iii) wherein the third core region has a radius $r_3=9.96\pm0.6$ μm and a specific refractive index difference $\Delta_3=0.07\pm0.03\%$.

17. The single-mode optical fiber according to claim 1,
i) wherein the first core region has a radius $r_1=3.05\pm0.6$ μm and a relative refractive index difference $\Delta_1(\%)=0.55\pm0.03\%$;
ii) wherein the second core region has a radius $r_2=5.75\pm0.6$ μm and a relative refractive index difference $\Delta_2=-0.18\pm0.03\%$; and
iii) wherein the third core region has a radius $r_3=10.79\pm0.6$ μm and a relative refractive index difference $\Delta_3=0.09\pm0.03\%$.

18. The single-mode optical fiber according to claim 1,
i) wherein the first core region has a radius $r_1=3.12\pm0.6$ μm and a relative refractive index difference $\Delta_1(\%)=0.53\pm0.03\%$;
ii) wherein the second core region has a radius $r_2=5.56\pm0.6$ μm and a relative refractive index difference $\Delta_2=-0.23\pm0.03\%$; and
iii) wherein the third core region has a radius $r_3=9.92\pm0.6$ μm and a relative refractive index difference $\Delta_3=0.10\pm0.03\%$.

19. The single-mode optical fiber according to claim 1,
i) wherein the first core region has a radius $r_1=3.24\pm0.6$ μm and a relative refractive index difference $\Delta_1(\%)=0.48\pm0.03\%$;
ii) wherein the second core region has a radius $r_2=5.72\pm0.6$ μm and a relative refractive index difference $\Delta_2=-0.17\pm0.03\%$; and
iii) wherein the third core region has a radius $r_3=8.54\pm0.6$ μm and a relative refractive index difference $\Delta_3=0.15\pm0.03\%$.

20. The single-mode optical fiber according to claim 1,
i) wherein the first core region has a radius $r_1=3.37\pm0.6$ μm and a relative refractive index difference $\Delta_1(\%)=0.50\pm0.03\%$;
ii) wherein the second core region has a radius $r_2=5.77\pm0.6$ μm and a relative refractive index difference $\Delta_2=-0.25\pm0.03\%$; and
iii) wherein the third core region has a radius $r_3=9.35\pm0.6$ μm and a relative refractive index difference $\Delta_3=0.14\pm0.03\%$.

21. The single-mode optical fiber according to claim 1,
i) wherein the first core region has a radius $r_1=3.18\pm0.6$ μm and a relative refractive index difference $\Delta_1(\%)=0.51\pm0.03\%$;
ii) wherein the second core region has a radius $r_2=6.18\pm0.6$ μm and a relative refractive index difference $\Delta_2=-0.19\pm0.03\%$; and
iii) wherein the third core region has a radius $r_3=8.65\pm0.6$ μm and a relative refractive index difference $\Delta_3=0.14\pm0.03\%$.

22. An optical transmission line comprising at least in part the optical fiber according to claim 1.

23. An optical transmission system having an optical transmission path comprising at least in part the optical transmission line according to claim 22.

24. A single-mode optical fiber suitable for a WDM (Wavelength Division Multiplexing) system, comprising:
(a) a first core region positioned in the center of cross section and having a radius $r_1$ from the center and a relative refractive index difference $\Delta_1$;
(b) a second core region surrounding the first core region and having a radius $r_2$ from the center and a relative refractive index difference $\Delta_2$;
(c) a third core region surrounding the second core region and having a radius $r_3$ from the center and a relative refractive index difference $\Delta_3$; and
(d) a clad region surrounding the third core region and having a radius $r_4$ from the center and a relative refractive index difference $\Delta_4$,
(e) wherein the radii of the regions have a relation of $r_1<r_2<r_3<r_4$, and the relative refractive index difference of the regions have relations of $\Delta_1>\Delta_2$, and $\Delta_2<\Delta_3$;
(here, $\Delta_1(\%)=[(n_1-n_c)/n_c]\times100$, $\Delta_2(\%)=[(n_2-n_c)/n_c]\times100$, $\Delta_3(\%)=[(n_3-n_c)/n_c]\times100$, $n_1$: a refractive index of the first core region, $n_2$: a refractive index of the second core region, $n_3$: a refractive index of the third core region, $n_c$: a refractive index of the clad region)
(f) wherein the optical fiber uses wavelength region from 1460 to 1625 nm, and has a dispersion value of 0.1 to 3.0 ps/nm-km at 1460 nm, 3.0 to 5.5 ps/nm-km at 1550 nm, and 4.5 to 8.0 ps/nm-km at 1625 nm;
(g) wherein a dispersion slope at 1550 nm is 0.023 to 0.05 ps/nm²-km;
(h) wherein an effective section area at 1550 nm is 35 to 50 μm²; and
(i) wherein a bending loss is 0.5 dB or less at 1625 nm under the condition of a bending radius of 30 mm, 100 turns.

25. The single-mode optical fiber according to claim 24, wherein the optical fiber has an effective section area of 35 to 50 μm² at 1460 nm.

26. The single-mode optical fiber according to claim 24, herein the optical fiber has a cutoff wavelength of 1450 nm or below.

27. The single-mode optical fiber according to claim 24, wherein a zero-dispersion wavelength is located at 1460 nm or below.

28. The single-mode optical fiber according to claim 24, wherein the optical fiber has a dispersion value of 0.3 to 2.4 ps/nm-km at 1460 nm.

29. The single-mode optical fiber according to claim 24, wherein the optical fiber has a dispersion value of 3.2 to 5.2 ps/nm-km at 1550 nm.

30. The single-mode optical fiber according to claim 24, wherein the optical fiber has a dispersion value of 4.8 to 7.7 ps/nm-km at 1625 nm.

* * * * *